Aug. 30, 1938.   H. S. JANDUS   2,128,298
BRAKE LEVER CONSTRUCTION
Original Filed Oct. 23, 1936
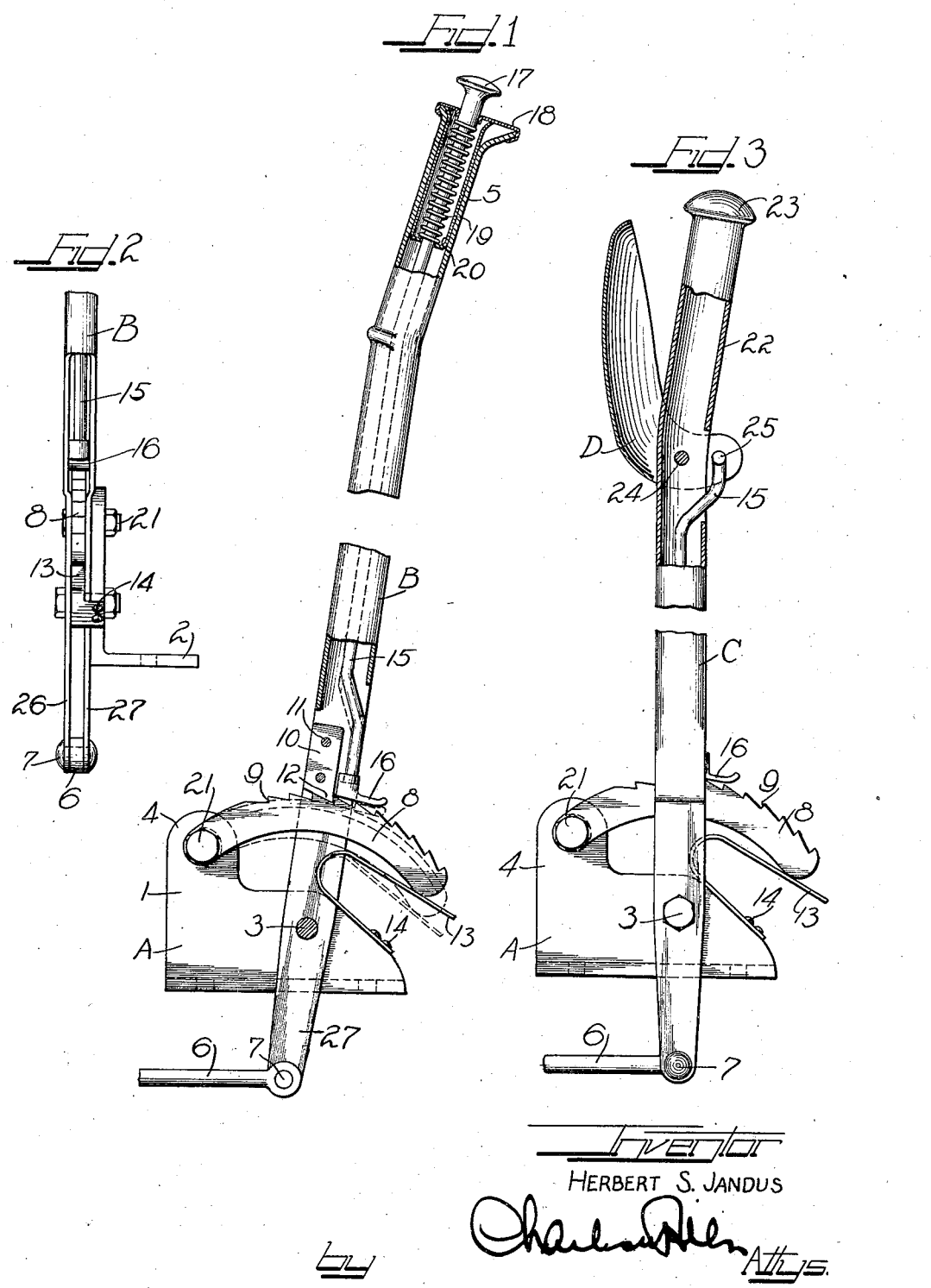
Inventor
HERBERT S. JANDUS
by
Attys.

Patented Aug. 30, 1938

2,128,298

UNITED STATES PATENT OFFICE 2,128,298

BRAKE LEVER CONSTRUCTION

Herbert S. Jandus, Detroit, Mich., assignor to Oakes Products Corporation, North Chicago, Ill., a corporation of Michigan Original application October 23, 1936, Serial No. 107,237. Divided and this application August 26, 1937, Serial No. 160,999

3 Claims. (Cl. 74—534)

The present invention relates to brake lever construction, and more particularly to brake lever construction for automotive vehicles.

An object of the present invention is to simplify and improve brake lever construction, particularly for automotive vehicles.

Another object of the present invention is to provide a brake lever construction which will readily latch the lever in any adjusted position and whereby the lever may be unlatched with minimum effort.

A further object of the present invention is to provide a brake lever construction which may be economically manufactured, easily applied and operated, and efficient and durable in use.

A still further object of the present invention is to provide a brake lever construction, including a bracket and a lever pivoted to it, the lever and bracket supporting cooperating engageable members for latching the lever in desired position, one of which members comprises a pivoted ratchet bar movable into and out of latching engagement with the other of the members.

The above, other and further objects of the present invention will be readily apparent from the following description and accompanying drawing.

The accompanying drawing illustrates an embodiment of the present invention and the views thereof are as follows:

Figure 1 is a view, partially in elevation and partially in section, of a brake lever construction embodying principles of the present invention, and showing the lever in latched or adjusted position.

Figure 2 is a fragmental edge elevational view of the lower part of the lever of Figure 1.

Figure 3 is a view, partially in side elevation and partially in section, showing the present invention applied to a hollow tubular lever in which the unlatching is effected by a spoonbill actuating member pivoted to the lever adjacent the grip portion of the same.

The drawing will now be explained.

The present application is a division of applicant's copending application, Serial No. 107,237, filed October 23, 1936.

A bracket, designated generally at A, is shown as having an upstanding part 1 and a horizontally disposed flange 2, for securement to a suitable portion of an automotive vehicle chassis. It is to be understood that the bracket A may be of any suitable form and shape as long as it is of sufficient extent to provide a part for the lever pivot 3 and an upstanding bracket part 4.

A lever B, illustrated in Figures 1 and 2 as formed as a stamping with a hollow shank portion, and a hollow grip portion 5 with bifurcated legs 26 and 27 is pivoted to the bracket A at 3. A brake rod 6 is pivoted at 7 to the lower end of the lever B as illustrated.

Pivoted to the upstanding portion 4 of the bracket A, is swinging ratchet bar 8. The bar 10 has teeth 9 formed on its upper margin, which margin is arcuate.

Fixed to the lever B is a dog or pawl 10 secured by rivets 11 or by welding, and which dog or pawl has a point 12 constituting a tooth to make latching engagement with any of the ratchet teeth 9 on the bar 8.

In order to maintain the ratchet bar 8 in position to be engaged by the tooth 12 of the pawl or dog 10, a spring 13 is interposed between the bracket A and the free end of the ratchet bar 8. The spring is illustrated as being substantially U-shaped in side elevation and is secured as by rivets 14 or the like to the bracket A and with a free portion of the spring engaging against the free end of the ratchet bar to urge it upwardly into position to be latched with the pawl or dog 10.

In order to unlatch the lever from the ratchet bar 8, an actuating rod 15 is arranged to work within the hollow shank and grip portions of the lever. The lower end of the actuating rod 15 is provided with a shoe 16 positioned to bear against the crests of the ratchet teeth 9 of the bar. When the bar is depressed, that is, moved downwardly as observed in Figures 1 and 2, the ratchet bar is swung away from the pawl or dog 10 and thus unlatched. The actuating rod 15 is of course held in projected position until the lever has been moved to release or other adjusted positions in clockwise direction as viewed in Figure 1.

The upper end of the actuating rod 15 is provided with a thumb button 17 which projects through the top 18 formed over the open end of the grip portion 5 of the lever. A spring 19 working between the button 17 and the inturned end of a sleeve 20, held within the cup portion of the lever, tends normally to hold the actuating bar in retracted position, that is in the position of full lines of Figure 1.

To set the brakes, the grip portion 5 of the lever B is moved in counterclockwise direction as viewed in Figure 1, which movement may be accomplished without depressing the button 17 and the rod 15, as during such movement the ratchet bar 8 will oscillate about its pivot 21 as the tooth 12 of the dog or pawl 10 moves along the ratchet teeth until the lever is in desired position, whereupon the tooth 12 of the dog or pawl engages one of the ratchet teeth and holds the lever in its then adjusted position. The position of the spring 13 tends to urge the ratchet bar into position to readily latch with the pawl or dog 10 whenever the lever is moved.

To release the lever from brake position, the button 17 is depressed, thus moving the rod 15 in a direction to move the teeth 9 of the ratchet bar 8 out of the path of movement of the tooth 12 of the pawl or dog whereupon the lever may be moved in clockwise direction. As soon as thumb pressure is relieved from the button 17, the spring 13 functions to move the ratchet bar into position to latch with the pawl or dog 10 on the lever B.

The lever illustrated in Figure 3 is, as far as the latching features are concerned, the same as heretofore described, the only difference being in the construction of the lever which lever C is formed as a stamping with a hollow shank portion and a hollow grip portion 22, the extremity of the latter to be enclosed by a suitable cap 23. A spoonbill actuating member, D, of stamped metal, is pivoted at 24 to the lever C, adjacent the grip portion 22, and to a portion of this actuating member D the actuating rod 15 is suitably connected as at 25.

The present invention has been illustrated in connection with a brake lever of the regular type, that is, one which is pivoted below the floor boards of an automotive vehicle, with the lever extending upwardly with its grip portion in convenient position to be grasped by the operator of the vehicle. It is to be understood that the invention is susceptible of use with brake levers of the dash type, that is to say, levers pivoted behind the instrument boards, to hang, with the grip portions available below the lower margins of the instrument boards.

For the sake of convenience the part 4 of the bracket A has been herein designated as the "upstanding part". By this is meant such portion of the bracket as may be displaced with reference to the lever pivot 3 so as to afford provision for pivotal mounting of the ratchet bar 8 to enable its operation in the manner described.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. Brake lever construction including a bracket, a lever pivoted to said bracket, a rockable ratchet bar pivoted to said bracket and having ratchet teeth along a margin, a pawl fixed to said lever in position to engage the said ratchet teeth, means for holding said ratchet bar against said pawl in latched engagement, and means including a shoe working against the ratchet teeth of said bar for moving the bar out of latching position with respect to said pawl.

2. An automotive brake lever construction including a bracket attachable to the vehicle frame, a lever pivoted to said bracket, a pawl fixed to said lever, a rockable ratchet bar pivoted to said bracket and provided with ratchet teeth arranged to be engaged by said pawl for latching the lever in adjusted position, a spring carried by said bracket and working against said bar to normally maintain said bar and pawl in latched engagement, an actuating rod movable with respect to said lever and carrying a shoe bearing against the ratchet teeth of said bar and operable to displace the bar from latching engagement with said pawl, and means adjacent the grip portion of the lever for manipulating said shoe.

3. An automotive vehicle emergency brake lever construction including a bracket, a lever pivoted to said bracket, a rockable ratchet pivoted to said bracket, a pawl fixed to said lever and adapted to make latching engagement with said bar, spring means for normally maintaining said bar and pawl in latched engagement, and manipulating means including a shoe engageable with push action against the teeth of said bar and manipulative to disengage said bar from latched engagement with the pawl.

HERBERT S. JANDUS.